United States Patent
Lee et al.

(10) Patent No.: US 12,404,371 B2
(45) Date of Patent: Sep. 2, 2025

(54) POLY(AMIDE-IMIDE) COPOLYMER, COMPOSITION AND POLYMER FILM COMPRISING THEREOF

(71) Applicant: LG CHEM, LTD., Seoul (KR)

(72) Inventors: Tae Seob Lee, Daejeon (KR); Yoon Bin Lim, Daejeon (KR); Jae Gu Lim, Daejeon (KR); Seung Joon Lim, Daejeon (KR); Se Jeong Kim, Daejeon (KR); Woo Han Kim, Daejeon (KR); Gieun Park, Daejeon (KR)

(73) Assignee: LG CHEM, LTD., Seoul (KR)

(*) Notice: Subject to any disclaimer, the term of this patent is extended or adjusted under 35 U.S.C. 154(b) by 773 days.

(21) Appl. No.: 17/053,260

(22) PCT Filed: Jan. 9, 2020

(86) PCT No.: PCT/KR2020/000369
§ 371 (c)(1),
(2) Date: Nov. 5, 2020

(87) PCT Pub. No.: WO2020/145674
PCT Pub. Date: Jul. 16, 2020

(65) Prior Publication Data
US 2021/0246265 A1    Aug. 12, 2021

(30) Foreign Application Priority Data

Jan. 11, 2019 (KR) .......... 10-2019-0003997
Jan. 8, 2020 (KR) .......... 10-2020-0002769

(51) Int. Cl.
C08G 73/14 (2006.01)
C08F 290/14 (2006.01)
C08G 73/10 (2006.01)
C08G 73/12 (2006.01)
C08J 5/18 (2006.01)

(52) U.S. Cl.
CPC .......... *C08G 73/14* (2013.01); *C08F 290/145* (2013.01); *C08G 73/1039* (2013.01); *C08G 73/1042* (2013.01); *C08G 73/12* (2013.01); *C08G 73/123* (2013.01); *C08G 73/126* (2013.01); *C08J 5/18* (2013.01); *C08L 2203/16* (2013.01)

(58) Field of Classification Search
CPC .......... C08G 73/14; C08G 73/1025; C08G 73/1042; C08J 2379/08; C08F 290/145; C08F 283/045; C08F 222/1006
See application file for complete search history.

(56) References Cited

U.S. PATENT DOCUMENTS 8,236,906 B2    8/2012 Ejiri et al.
2017/0101509 A1    4/2017 Jee et al.
2018/0194900 A1    7/2018 Choi et al.
2018/0355110 A1    12/2018 Kim et al.
2019/0010292 A1*    1/2019 Yun .............. C08J 5/18
2019/0016849 A1    1/2019 Yun et al.
2019/0023846 A1    1/2019 Yun et al.
2020/0166842 A1    5/2020 Hwang et al.

FOREIGN PATENT DOCUMENTS

| JP | 2015-174905 A | 10/2015 |
| JP | 2018-538397 A | 12/2018 |
| JP | 6918400 B2 | 8/2021 |
| KR | 10-2011-0030286 A | 3/2011 |
| KR | 20110030286 * | 3/2011 |
| KR | 10-2016-0020229 A | 2/2016 |
| KR | 10-2017-0003272 A | 1/2017 |
| KR | 10-2017-0043447 A | 4/2017 |
| KR | 10-2017-0132459 A | 12/2017 |
| KR | 10-2017-0136262 A | 12/2017 |
| KR | 10-2018-0029774 A | 3/2018 |
| KR | 10-2019-0103868 A | 9/2019 |
| TW | 201738298 A | 11/2017 |

(Continued)

OTHER PUBLICATIONS

Andrzejewska, Free Radicalphotopolymerization of Multifunctional Monomers, Book Chapter 2, Three-Dimensional Microfabrication Using Two-Photon Polymerization, Elsevier, pp. 62-81 (Year: 2016).*
International Search Report issued for International Application No. PCT/KR2020/000369 Apr. 29, 2020, 4 pages.
Kim, J. W. et al., "Synthesis and performance of polyimide films for the flexible organic light emitting diodes", Molecular Crystals and Liquid Crystals, 2009, vol. 513, pp. 214-226.
Monica R. de la Viuda et al., "Novel functionalized polyamides prone to undergo thermal Claisen rearrangement in the solid state",Polymer Chemistry, 2018, 9, pp. 4007-4016.

(Continued)

*Primary Examiner* — David J Buttner
*Assistant Examiner* — Surbhi M Du
(74) *Attorney, Agent, or Firm* — ROTHWELL, FIGG, ERNST & MANBECK, P.C.

(57) ABSTRACT

The present disclosure relates to a poly(amide-imide) copolymer in which each of at least one of imide repeating units and at least one of amide repeating units is substituted with a functional group including Chemical Formula 1,

[Chemical Formula 1]

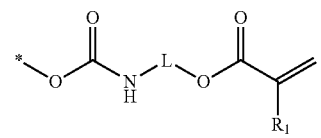

wherein, $R_1$ is hydrogen or an alkyl group having 1 to 10 carbon atoms, and L is a single bond or an alkylene having 1 to 10 carbon atoms, and a composition and a polymer film comprising the same.

13 Claims, No Drawings

(56) References Cited

FOREIGN PATENT DOCUMENTS

| | | | |
|---|---|---|---|
| TW | 201742880 A | 12/2017 | |
| WO | WO-2018052221 A1 * | 3/2018 | ............. C08G 18/64 |
| WO | 2018-135431 A1 | 7/2018 | |

OTHER PUBLICATIONS

Kye-Hyun Kim et al., "Synthesis and Characterization of Photosensitive Polyimides for Optical Applications", Macromolecules, (2001) vol. 34, No. 26, pp. 8925-8933.

* cited by examiner

POLY(AMIDE-IMIDE) COPOLYMER, COMPOSITION AND POLYMER FILM COMPRISING THEREOF

CROSS-REFERENCE TO RELATED APPLICATION(S)

This application application is a 35 U.S.C. 371 National Phase Entry Application from PCT/KR2020/000369 filed on Jan. 9, 2020, designating the United States, which claims priority to or the benefit of Korean Patent Application No. 10-2019-0003997 filed on Jan. 11, 2019, and Korean Patent Application No. 10-2020-0002769 filed on Jan. 8, 2020 in the Korean Intellectual Property Office, the disclosures of which are incorporated herein by reference in their entirety.

The present disclosure relates to a poly(amide-imide) copolymer, a composition and a polymer film comprising the same.

BACKGROUND OF THE INVENTION

Polyimide resins are polymers having relatively low crystallinity or mostly having an amorphous structure, and exhibits excellent heat resistance, chemical resistance, electrical properties, and dimensional stability due to their rigid chain structure. Thus, these polyimide resins are widely used as materials for electric/electronics.

However, the polyimide resins have many limitations in use because they may appear dark brown in color due to the formation of a charge transfer complex (CTC) of π electrons present in the imide chain, and it is difficult to secure transparency.

In order to solve the above limitations and obtain a colorless transparent polyimide resin, a method of restricting the movement of the π electrons by introducing a strong electron attracting group such as a trifluoromethyl (—$CF_3$) group; a method of reducing the formation of the CTC by introducing a sulfone (—$SO_2$—) group, an ether (—O—) group, or the like into the main chain to make a bent structure; or a method of inhibiting the formation of the resonance structure of the π electrons by introducing an aliphatic cyclic compound, has been proposed.

However, it is difficult for the polyimide resin according to the above proposals to exhibit sufficient heat resistance due to the bending structure or the aliphatic cyclic compound, and a film prepared using the same still has limitations such as poor mechanical properties.

In addition, most polyimide resins are formed by imidization of polyamic acid as a precursor, but as the final curing is performed in the curing process at a high temperature of 300° C. or higher, the physical properties of the electrical wiring and substrates are reduced, in particular, when used as a semiconductor protective film, it may cause a problem of lowering the electrical properties of the semiconductor or destroying the semiconductor properties.

Therefore, in order to be used as a flexible display material in recent years, there is a need for the development of poly(amide-imide) copolymer capable of low temperature curing together with excellent optical properties, mechanical properties and chemical resistance.

BRIEF SUMMARY OF THE INVENTION

The present disclosure provides a poly(amide-imide) copolymer capable of low temperature curing and also exhibiting excellent mechanical properties, heat resistance and chemical resistance while being colorless and transparent.

The present disclosure also provides a composition and a polymer film including the poly(amide-imide) copolymer.

In one aspect of the present disclosure, there can be provided a poly(amide-imide) copolymer in which at least one of an imide repeating unit and an amide repeating unit is substituted with one or more specific functional groups.

In another aspect of the present disclosure, there can be provided a composition including the poly(amide-imide) copolymer.

In a further aspect of the present disclosure, there can be provided a polymer film including poly(amide-imide) copolymer.

DETAILED DESCRIPTION OF THE INVENTION

Hereinafter, a poly(amide-imide) copolymer, a composition and a polymer film comprising the same according to embodiments of the present disclosure will be described in more detail.

Unless expressly stated herein, the terms are only for describing specific exemplary embodiments and are not intended to limit the present disclosure.

The singular terms used herein include plural terms unless phrases clearly express opposite meanings.

It should be understood that the terms "comprise", "include" and the like as used herein are intended to specify certain features, regions, integers, steps, operations, elements and/or components, and these do not preclude the possibility of existence or addition of other features, integers, steps, operations, elements, components and/or groups.

As used herein, (meth)acrylic is intended to include both acrylic and methacrylic.

As used herein, "*" denotes a position linked to the same or different atom or Chemical Formula.

As used herein, the imide repeating unit means a repeating unit having an imide bond in the polymer main chain, and the amide repeating unit means a repeating unit having an amide bond in the polymer main chain.

According to one embodiment of the present disclosure, there can be provided a poly(amide-imide) copolymer in which at least one of an imide repeating unit and an amide repeating unit is substituted with one or more functional groups including the following Chemical Formula 1.

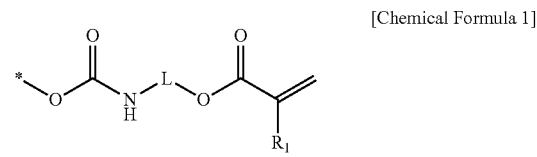

[Chemical Formula 1]

wherein,
$R_1$ is hydrogen or an alkyl group having 1 to 10 carbon atoms, and
L is a single bond or an alkylene having 1 to 10 carbon atoms.

The present inventors have found through experiments that when at least one of the imide repeating unit and the amide repeating unit included in the poly(amide-imide) copolymer includes a functional group including Chemical Formula 1, it can be cured at low temperature of 200° C. or lower, or 150° C. or lower and also exhibit excellent mechanical properties, heat resistance and chemical resistance while being colorless and transparent, thereby completing the present disclosure.

Accordingly, the poly(amide-imide) copolymer can be usefully used in products or industrial fields that require low-temperature curing while requiring high mechanical properties, for example, as display substrates, protective polymer films for displays, touch panels, cover polymer films of flexible or foldable devices.

The poly(amide-imide) copolymer of the embodiment includes an imide repeating unit having an imide bond in a polymer main chain, and an amide repeating unit having an amide bond in a polymer main chain, wherein at least one of the imide repeating unit and the amide repeating unit may be substituted with one or more functional groups including Chemical Formula 1.

The repeating unit in which one or more functional groups including Chemical Formula 1 is substituted may be contained in an amount of 5 to 100 parts by mol based on 100 parts by mol of the poly(amide-imide) copolymer. When the content of the repeating unit in which one or more functional groups including Chemical Formula 1 is substituted is less than 5 parts by mol, the degree of UV curing becomes extremely low, and it becomes difficult to sufficiently perform crosslinking between the polymer chains.

Hereinafter, the above-mentioned poly(amide-imide) copolymer will be described in more detail.

Since the poly(amide-imide) copolymer includes an imide repeating unit and an amide repeating unit together, and at least one of the imide repeating unit and the amide repeating unit is substituted with a photocurable functional group including Chemical Formula 1, it can be photocured while improving the thermal, mechanical and optical properties of the copolymer, and therefore, the heat-curing process can be performed at a low temperature of 200° C. or less or 150° C. or less in the subsequent polymer film manufacturing process, and the problems of deteriorating the physical properties of electric wiring and a substrate, particularly a wafer, can be prevented.

Specifically, in the functional group including Chemical Formula 1, $R_1$ may be hydrogen or methyl group.

Further, L may be an alkylene having 1 to 5 carbon atoms, and may also be ethylene.

Further, the functional group including Chemical Formula 1 may be any one selected from the group consisting of the following:

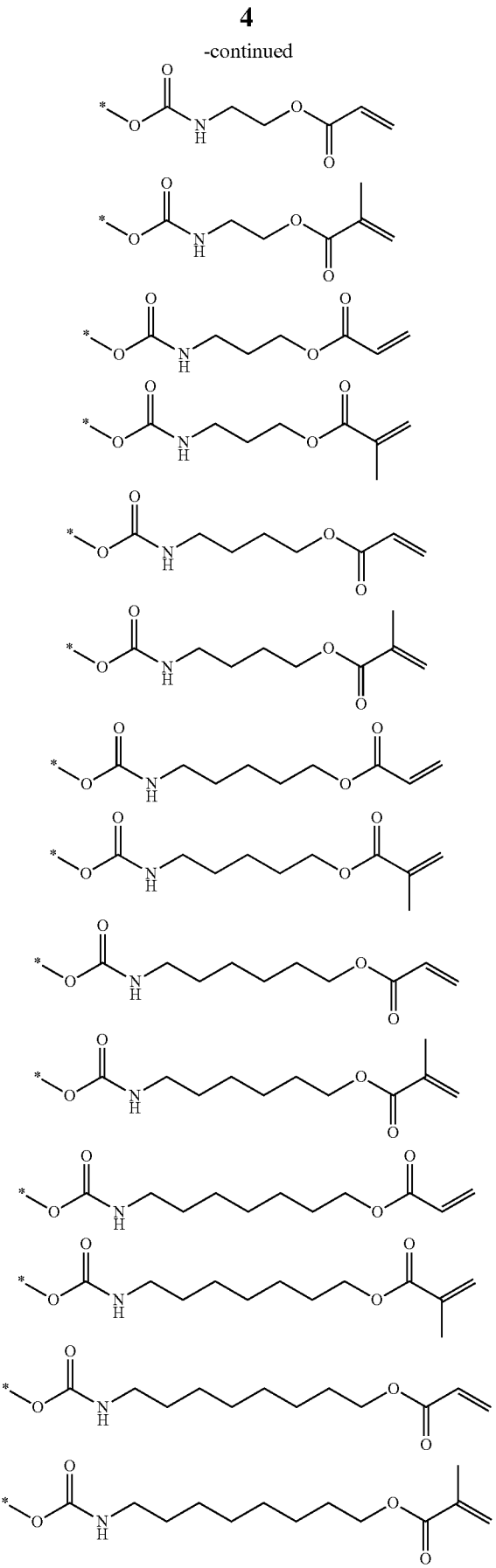

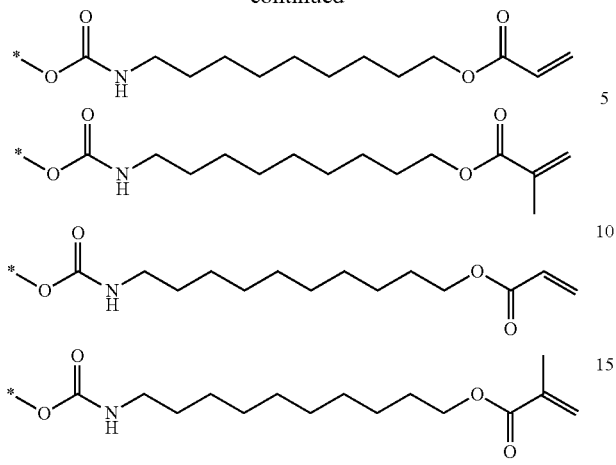

(i) Imide Repeating Units: First Repeating Unit and Second Repeating Unit

The imide repeat unit included in the poly(amide-imide) copolymer according to one embodiment may include any one selected from the group consisting of a first repeating unit represented by the following Chemical Formula 2-1 and a second repeating unit represented by the following Chemical Formula 2-2.

[Chemical Formula 2-1]

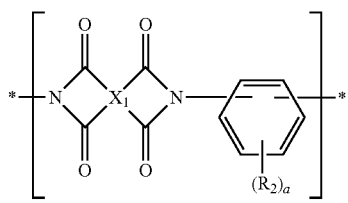

[Chemical Formula 2-2]

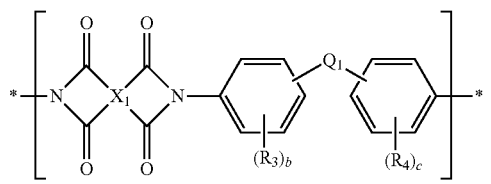

wherein, in Chemical Formulas 2-1 and 2-2, $X_1$ is a tetravalent organic group, $R_2$ to $R_4$ are each independently hydrogen; a hydroxy group; an alkyl group having 1 to 10 carbon atoms; or a functional group including Chemical Formula 1, $Q_1$ is a single bond, —O—, —S—, —C(=O)—, —CH(OH)—, —S(=O)$_2$—, —Si(CH$_3$)$_2$—, —(CH$_2$)p- (where 1≤p≤10), —(CF$_2$)q- (where 1≤q≤10), —C(CH$_3$)$_2$—, —C(CF$_3$)$_2$— or —C(=O)NH—, and a, b, and c are each independently an integer of 1 to 4.

For example, the $X_1$ can be any one selected from the group represented by the following structural formulas.

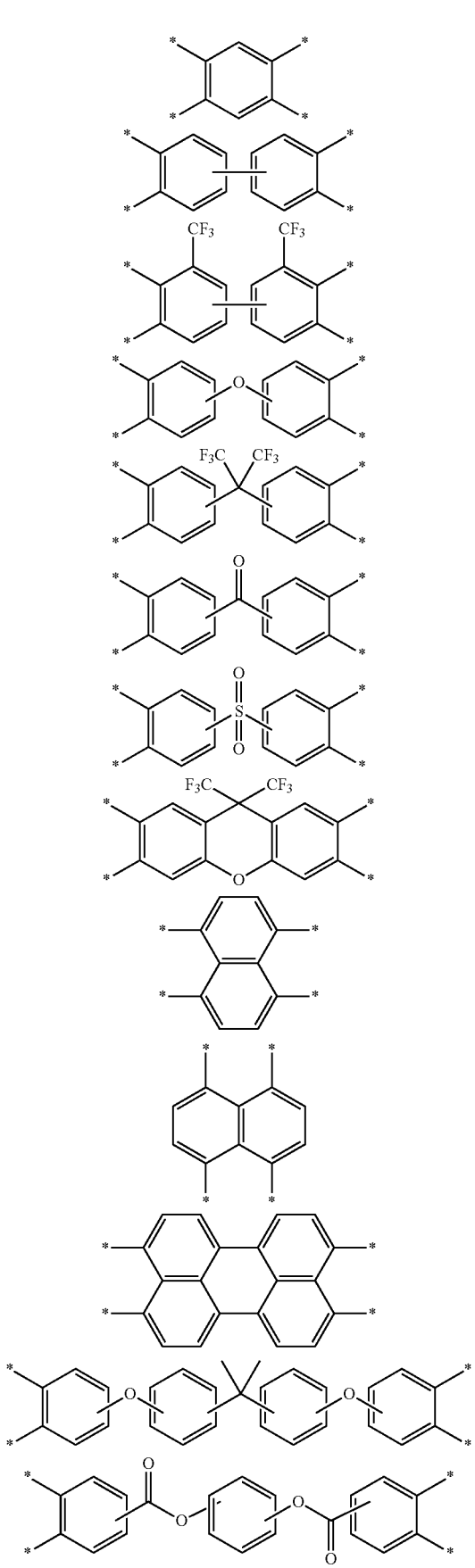

-continued

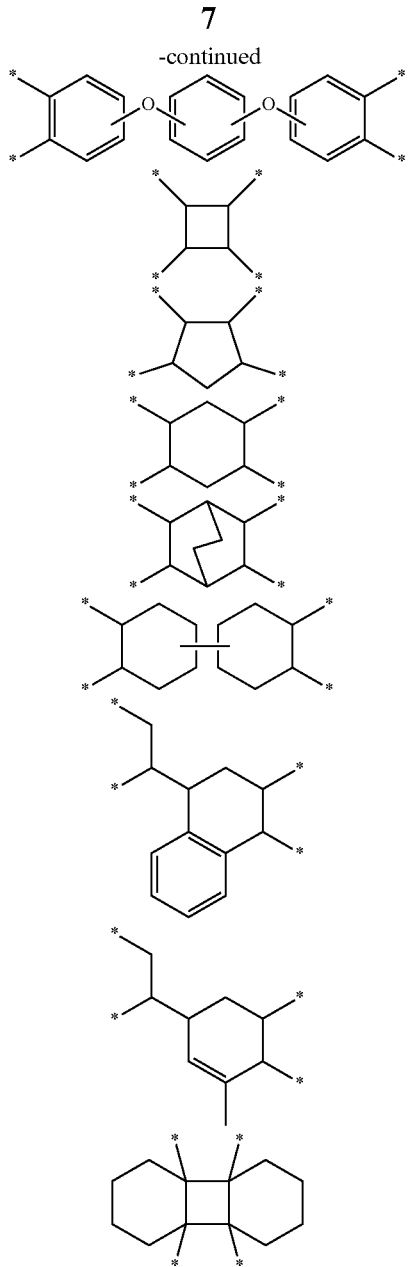

Further, in Chemical Formula 2-1, $R_2$ may be a functional group including Chemical Formula 1.

Further, in Chemical Formula 2-2, at least one of $R_3$ and $R_4$ may be a functional group including Chemical Formula 1.

Further, the molar ratio of the first repeating unit and the second repeating unit in the poly(amide-imide) copolymer may be 10:90 to 90:10, 20:80 to 80:20, or 30:70 to 70:30. By satisfying these molar ratios, it is colorless and transparent and can exhibit excellent heat resistance and chemical resistance while maintaining high mechanical properties. Meanwhile, when the molar ratio of the first repeating unit and the second repeating unit is out of the above-mentioned range, problems such as yellowing may occur.

(ii) Amide Repeating Units: Third Repeating Unit and Fourth Repeating Unit

The amide repeating unit contained in the poly(amide-imide) copolymer according to one embodiment may include any one selected from the group consisting of a third repeating unit represented by the following Chemical Formula 3-1 and a fourth repeating unit represented by the following Chemical Formula 3-2.

[Chemical Formula 3-1]

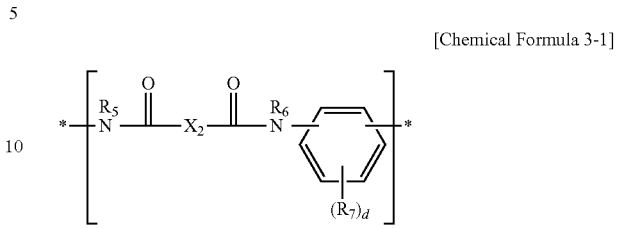

[Chemical Formula 3-2]

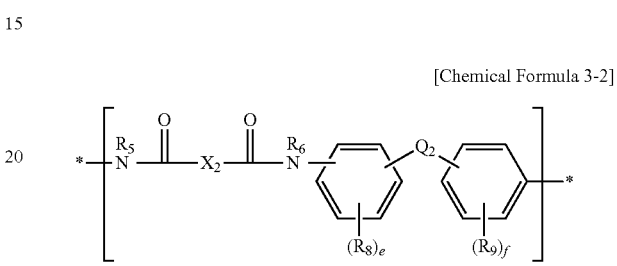

wherein, in Chemical Formulas 3-1 and 3-2, $X_2$ is an arylene group having 6 to 30 carbon atoms, $R_5$ and $R_6$ are each independently hydrogen, or an alkyl group having 1 to 10 carbon atoms, $R_7$ to $R_9$ are each independently hydrogen; a hydroxyl group; an alkyl group having 1 to 10 carbon atoms; or a functional group including Chemical Formula 1, $Q_2$ is a single bond, —O—, —S—, —C(=O)—, —CH(OH)—, —S(=O)$_2$—, —Si(CH$_3$)$_2$—, —(CH$_2$)p- (where $1 \leq p \leq 10$), —(CF$_2$)q- (where $1 \leq q \leq 10$), —C(CH$_3$)$_2$—, —C(CF$_3$)$_2$— or —C(=O)NH—, and d, e and f are each independently an integer of 1 to 4.

For example, the $X_2$ may be any one selected from the group represented by the following structural formulas.

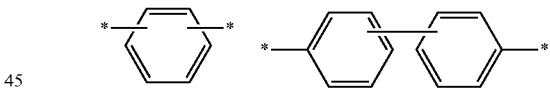

Further, in Chemical Formula 3-1, $R_7$ may be a functional group including Chemical Formula 1.

Further, in Chemical Formula 3-2, at least one of $R_8$ and $R_9$ may be a functional group including Chemical Formula 1.

Further, the molar ratio of the third repeating unit and the fourth repeating unit in the poly(amide-imide) copolymer may be 10:90 to 90:10 or 10:90 to 50:50. By satisfying these molar ratios, it is colorless and transparent and can exhibit excellent heat and chemical resistance while maintaining high mechanical properties. Meanwhile, when the molar ratio of the third repeating unit and the fourth repeating unit is out of the above-mentioned range, problems such as an increase in haze or yellowing may occur.

The molar ratio of the amide repeating unit and the imide repeating unit contained in the poly(amide-imide) copolymer according to one embodiment may be 10:90 to 90:10, 20:80 to 80:20, or 30:70 to 70:30. If such molar ratio is out of the above-mentioned range, problems such as an increase in haze or a decrease in solubility may occur.

Meanwhile, the weight average molecular weight of the poly(amide-imide) copolymer may be 5,000 to 300,000 g/mol, 10,000 to 250,000 g/mol, or 50,000 to 200,000 g/mol. If the weight average molecular weight of the poly(amide-imide) copolymer is less than 5,000 g/mol, it may be difficult to form a film with a composition comprising the same, and if it exceeds 300,000 g/mol, there is a problem that the solubility is reduced. In this specification, the weight average molecular weight means a weight average molecular weight in terms of polystyrene measured by a GPC method.

According to another embodiment of the present disclosure, there is provided a composition including the poly(amide-imide) copolymer.

The composition includes the poly(amide-imide) copolymer having excellent transparency, heat resistance, chemical resistance, and mechanical strength as described above, thereby providing a composition capable of forming a polymer film having excellent transparency, heat resistance, chemical resistance, and mechanical strength.

Further, since the poly(amide-imide) copolymer is substituted with a functional group including the Chemical Formula 1 capable of photocuring, it can be heat-cured at a low temperature, thereby preventing the problem of deteriorating physical properties of an electrical wiring or a substrate, particularly a wafer.

The composition may further include a photoinitiator, a polyfunctional (meth)acrylate monomer, a solvent, and the like in addition to the poly(amide-imide) copolymer.

As the polyfunctional (meth)acrylate monomer, there may be mentioned bifunctional acrylates such as 1,2-ethylene glycol di(meth)acrylate, 1,4-butanediol di(meth)acrylate, 1,6-hexanediol di(meth)acrylate, neopentylglycol di(meth)acrylate, polyethylene glycol di(meth)acrylate, neopentyl glycol adipate di(meth)acrylate, hydroxyl pivalic acid neopentylglycol di(meth)acrylate, dicyclopentanyl di(meth)acrylate, or caprolactone modified dicyclopentenyl di(meth)acrylate; trifunctional acrylates such as trimethylolpropane tri(meth)acrylate, or dipentaerythritol tri(meth)acrylate; tetrafunctional acrylates such as diglycerin tetra(meth)acrylate or pentaerythritol tetra(meth)acrylate; pentafunctional acrylates such as propionic acid modified dipentaerythritol penta(meth)acrylate; and hexafunctional acrylates such as dipentaerythritol hexa(meth)acrylate, caprolactone modified dipentaerythritol hexa(meth)acrylate or urethane (meth)acrylate, without being limited thereto. Further, as specific examples, one or more of KAYARAD DPCA-20, KAYARAD DPCA-30, KAYARAD DPCA-60, KAYARAD DPCA120, KAYARAD DPEA-12, KAYARAD HX-620 and the like (manufactured by Nippon Kayaku Co., Ltd.) can be used, without being limited thereto.

The photoinitiator that can be additionally included in the composition may include, for example, α-hydroxyketone compounds (ex. IRGACURE 184, IRGACURE 500, IRGACURE 2959, DAROCUR 1173; manufactured by Ciba Specialty Chemicals); phenylglyoxylate compounds (ex. IRGACURE 754, DAROCUR MBF; manufactured by Ciba Specialty Chemicals); benzyldimethylketal compounds (ex. IRGACURE 651; manufactured by Ciba Specialty Chemicals); α-aminoketone compounds (ex. IRGACURE 369, IRGACURE 907, IRGACURE 1300; manufactured by Ciba Specialty Chemicals); monoacylphosphine compounds (MAPO) (ex. DAROCUR TPO; manufactured by Ciba Specialty Chemicals); bisacylphosphine compounds (BAPO) (ex. IRGACURE 819, IRGACURE 819DW; manufactured by Ciba Specialty Chemicals); phosphineoxide compounds (ex. IRGACURE 2100; manufactured by Ciba Specialty Chemicals); metallocene compounds (ex. IRGACURE 784; manufactured by Ciba Specialty Chemicals); iodonium salts (ex. IRGACURE 250; manufactured by Ciba Specialty Chemicals); and a mixture of at least one compound thereof (ex. DAROCUR 4265, IRGACURE 2022, IRGACURE 1300, IRGACURE 2005, IRGACURE 2010, IRGACURE 2020; manufactured by Ciba Specialty Chemicals), and the like, without being limited thereto.

The photoinitiator may be contained in an amount of 0.1 to 10 parts by weight or 0.5 to 8 parts by weight based on 100 parts by weight of the poly(amide-imide) copolymer. If the content of the photoinitiator is less than 0.5 parts by weight, the polymer film including the poly(amide-imide) copolymer cannot be sufficiently cured. If the content exceeds 8 parts by weight, the polymer film may deteriorate in the optical and mechanical properties.

The composition according to the other embodiment may further include a surfactant. The surfactant may be contained in an amount of 0.001 to 0.8 parts by weight based on 100 parts by weight of the poly(amide-imide) copolymer. If the content of the surfactant is less than 0.001 parts by weight, the surface of the polymer film containing the poly(amide-imide) copolymer is not formed uniformly, and if it exceeds 0.8 weight part, it becomes difficult to cure the composition, and the mechanical properties can be reduced.

The composition according to the other embodiment may further include a solvent for controlling the viscosity. The solvent may include, for example, tetrahydrofuran (THF), propylene glycol monoethyl ether, PGMEA, methyl ethyl ketone (MEK), dimethylacetamide (DMAc), and the like, without being limited thereto.

The solvent may be contained in an amount of 50 to 1000 parts by weight based on 100 parts by weight of the poly(amide-imide) copolymer. If the content of the solvent is less than 50 parts by weight, there is a problem that the solubility is reduced. If the content exceeds 1000 parts by weight, the viscosity may be too low, and it may be difficult to coat the composition containing the poly(amide-imide) copolymer.

According to another embodiment of the present disclosure, there is provided a polymer film including the poly(amide-imide) copolymer.

The polymer film includes the poly(amide-imide) copolymer having excellent transparency, heat resistance, chemical resistance, and mechanical strength as described above, thereby providing a polymer film having excellent transparency, heat resistance, chemical resistance, and mechanical strength.

Specifically, the polymer film including the poly(amide-imide) copolymer may have a yellow index (YI) of 3.0 or less, 2.5 or less, or 2.0 or less as measured according to ASTM D1925 based on a thickness of 50±2 μm. When the yellow index of the polymer film is within the above range, it may appear transparent and colorless.

Further, the polymer film including the poly(amide-imide) copolymer may have a haze of 2% or less, 1.5% or less, or 1.0% or less as measured according to ASTM D1003. When the haze of the polymer film is within the range, the polymer film can be sufficiently transparent and thus have excellent sharpness.

The polymer film may have a thickness of 20 to 100 μm, 30 to 90 μm, or 40 to 80 μm, without being limited thereto. The thickness may be appropriately adjusted according to the use.

According to another embodiment of the present disclosure, there is provided a method for producing a polymer film including the steps of: coating onto a substrate and curing at a temperature of 200° C. or less.

Specifically, the method for producing a polymer film may include the steps of: coating the composition including the poly(amide-imide) copolymer onto a substrate, and curing the coated composition.

In addition, the step of curing the coated composition may include both photo-curing and heat-curing. Such photo-curing and heat-curing can be performed simultaneously or sequentially. For example, the photo-curing may be performed to semi-cure the coated composition, which is then heat-cured at low temperature to finally produce a polymer film.

In particular, the poly(amide-imide) copolymer can be photo-cured by containing a photocurable functional group including Chemical Formula 1.

The irradiation dose of ultraviolet light during such photocuring step may be, for example, about 200 to about 1500 mJ/cm². As the light source for ultraviolet irradiation, for example, a high-pressure mercury lamp, a metal halide lamp, a black light fluorescent lamp, or the like may be used, without being limited thereto. The photocuring step may be performed by irradiating at the irradiation dose as described above for about 1 minute to 10 minutes.

Since the poly(amide-imide) copolymer can be photo-cured, it can be heat-cured even at a low temperature of 200° C. or lower, or 90 to 180° C. Further, by additionally proceeding such a low temperature heat-curing, it is possible to improve the physical properties of the polymer film. If the temperature exceeds 200° C., the physical properties of the film can be reduced.

Meanwhile, specific examples of the substrate include various plastic polymer films or glass substrates, such as polyethylene terephthalate, polyethylene naphthalate, polypropylene, polyethylene, cellulose triacetate, cellulose diacetate, poly(meth)acrylic acid alkyl ester, poly(meth)acrylic acid ester copolymer, polyvinyl chloride, polyvinyl alcohol, polycarbonate, polystyrene, cellophane, polyvinylidene chloride copolymer, polyamide, polyimide, vinyl chloride •vinyl acetate copolymer, polytetrafluoroethylene, and polytrifluoroethylene, without being limited thereto.

Meanwhile, for example, as the coating method, a bar coating method, a knife coating method, a roller coating method, a blade coating method, a die coating method, a micro-gravure coating method, a comma coating method, a slot die coating method, a lip coating method, a solution casting method or the like may be used, without being limited thereto.

Because the polymer film exhibits excellent transparency, heat resistance, chemical resistance and mechanical strength, it can be used in a diverse range of fields such as device substrate, display substrate, optical polymer film, integrated circuit (IC) package, adhesive polymer film, multilayer FRC (flexible printed circuit), tape, touch panel, protective polymer film for optical disc, etc.

Advantageous Effects

According to the present disclosure, there is provided a poly(amide-imide) copolymer that is colorless and transparent, and has excellent mechanical properties, heat resistance, and chemical resistance, and can be cured at low temperature, and a composition and a polymer film including the same.

Since the polymer film including the poly(amide-imide) copolymer has the above-mentioned characteristics, it can be applied to display substrates, protective polymer films for displays, touch panels, cover polymer films for flexible or foldable equipments, etc.

Detailed Description of the Embodiments

Hereinafter, preferred examples are provided for better understanding. However, these examples are for illustrative purposes only, and the present disclosure is not intended to be limited by these examples.

Example and Comparative Example: Preparation of Copolymer

Example 1: Preparation of poly(amide-imide) copolymer (A)

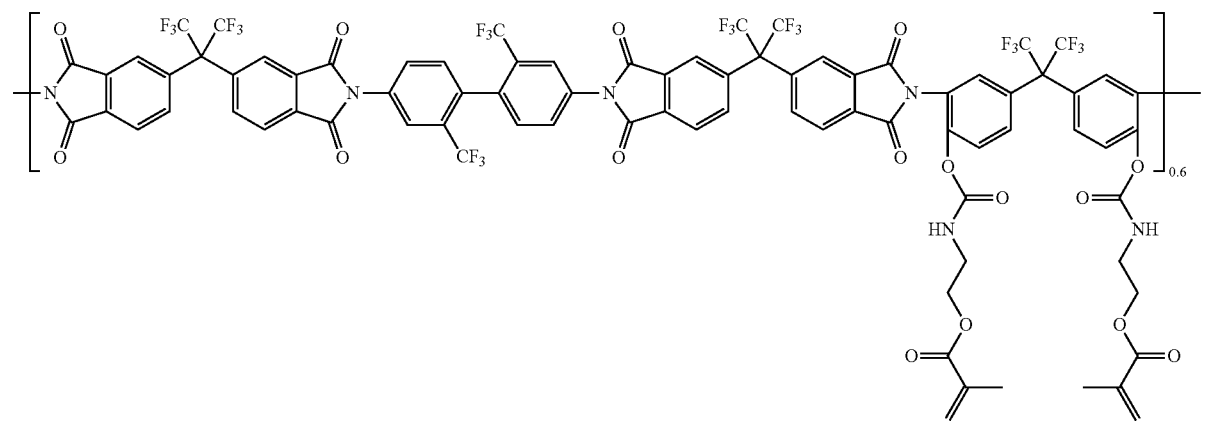

-continued

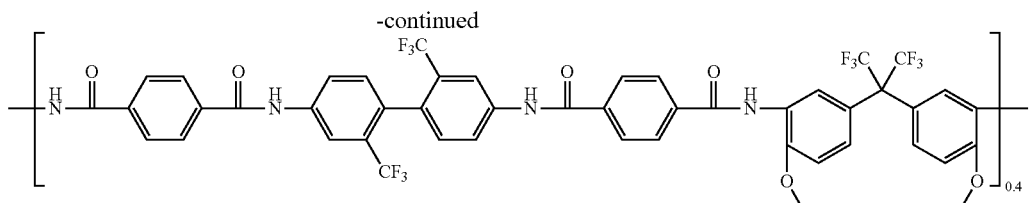
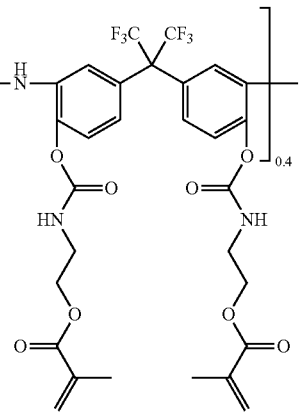

To a 500 mL three-necked round bottomed flask equipped with a Dean-Stark trap, a nitrogen inlet and a mechanical stirrer, 6.34 g (19.8 mmol) of 2,2'-bis(trifluoromethyl)-4,4'-diamino biphenyl (TFMB) and 3.63 g (9.91 mmol) of 2,2-bis(3-amino-4-hydroxyphenyl)hexafluoropropane (BisAPAF) were added while passing nitrogen gas therethrough, dissolved in 183 g of N-methyl-2-pyrrolidone (NMP) and then heated at 40° C.

Then, 8.00 g (18.0 mmol) of 4,4'-(hexafluoroisopropylidene)diphthalic anhydride (6FDA) was added thereto, and the mixture was stirred at 40° C. for about 3 hours. 2.44 g (12.0 mmol) of terephthaloyl chloride (TPC) were added thereto, and then stirred for 3 hours.

Then, 0.47 g (3.00 mmol) of gamma-valerolactone, 0.47 g (5.94 mmol) of pyridine and 20 g of toluene were added, and then stirred at 150° C. for 24 hours. After the reaction was completed, excess ethanol (2 L) was added dropwise to the stirred reaction solution to form a precipitate. The obtained precipitate was separated by filtration under reduced pressure, washed three times with ethanol, and then dried at room temperature under vacuum for about 24 hours to obtain 15 g of an intermediate (A-1).

15 g of the intermediate (A-1) and 0.3 g (1.36 mmol) of butylated hydroxy toluene (BHT) were added to a 500 mL three-necked round bottom flask while passing nitrogen gas therethrough, and dissolved in 200 g of tetrahydrofuran (THF).

1.56 g (10.1 mmol) of 2-(methacryloyloxy)ethyl isocyanate (MOI) and 0.38 g (0.60 mmol) of dibutyltin dilaurate were added sequentially, heated at 50° C. and then stirred for 18 hours. After the reaction was completed, excess ethanol (2 L) was added dropwise to the stirred reaction solution to form a precipitate. The obtained precipitate was separated by filtration under reduced pressure, washed three times with ethanol, and then dried at room temperature under vacuum for about 24 hours to obtain 12 g of a poly(amide-imide) copolymer (A).

The molecular weight of the obtained poly(amide-imide) copolymer (A) was measured through GPC (gel permeation chromatography) in a THE solvent, and the measurement result showed a weight average molecular weight (Mw) of 48,000 g/mol.

Example 2: Preparation of poly(amide-imide) copolymer (B)

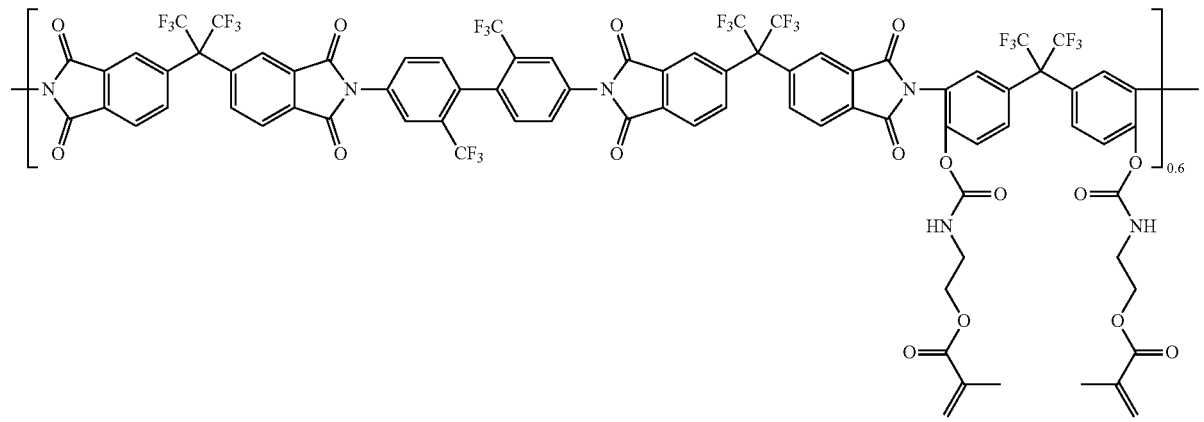

-continued

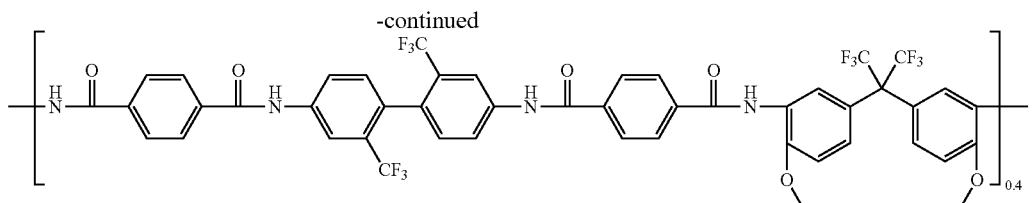

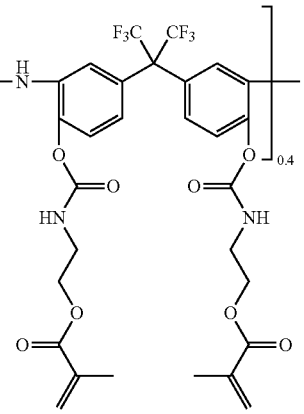

12.2 g of a poly(amide-imide) copolymer (B) was prepared in the same manner in Example 1, except that 2,2'-bis(trifluoromethyl)-4,4'-diamino biphenyl and 2,2-bis(3-amino-4-hydroxyphenyl)hexafluoropropane were used in an amount of 7.69 g (24.0 mmol) and 2.20 g (6.00 mmol), respectively.

The molecular weight of the obtained poly(amide-imide) copolymer (B) was measured through GPC (gel permeation chromatography) in a THE solvent, and the measurement result showed a weight average molecular weight (Mw) of 46,000 g/mol.

Example 3: Preparation of poly(amide-imide) copolymer (C)

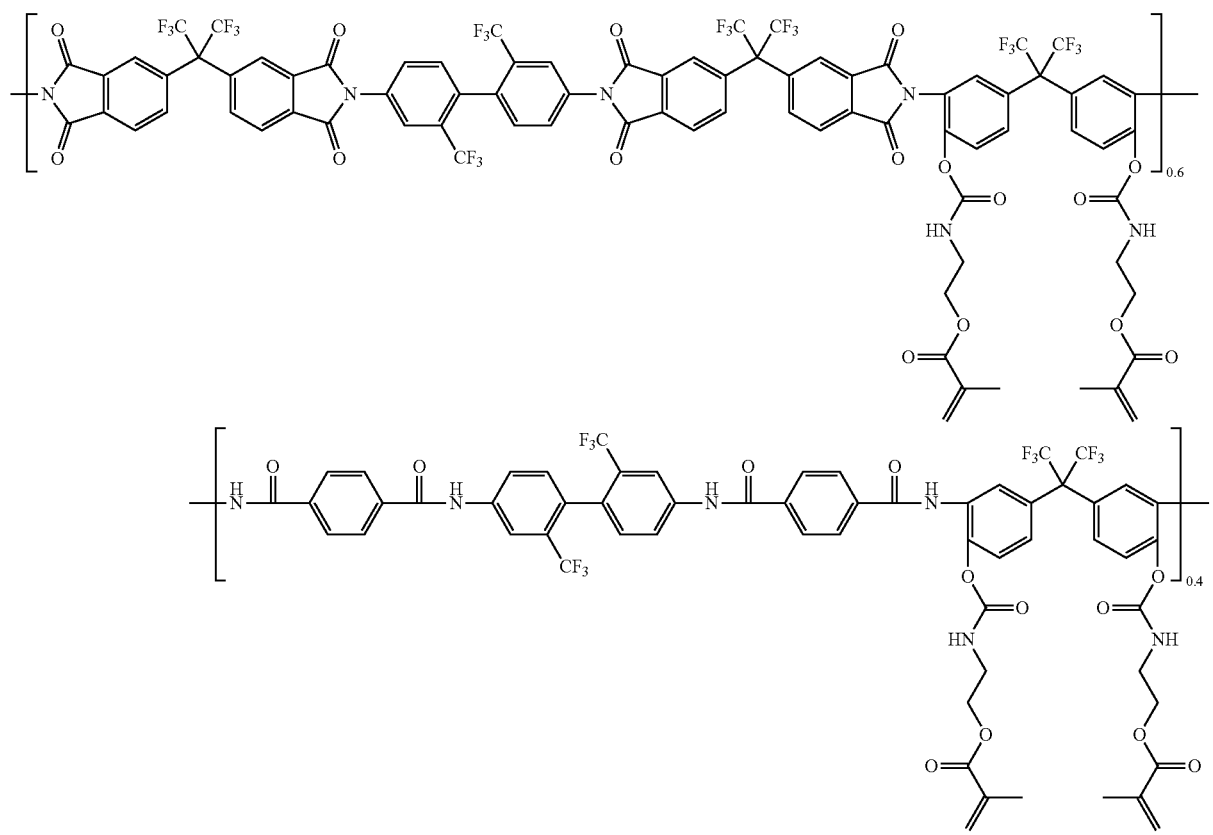

12.2 g of a poly(amide-imide) copolymer (C) was prepared in the same manner in Example 1, except that 2,2'-bis(trifluoromethyl)-4,4'-diamino biphenyl and 2,2-bis(3-amino-4-hydroxyphenyl)hexafluoropropane were used in an amount of 5.76 g (18.0 mmol) and 4.40 g (12.00 mmol), respectively.

The molecular weight of the obtained poly(amide-imide) copolymer (C) was measured through GPC (gel permeation chromatography) in a THF solvent, and the measurement result showed a weight average molecular weight (Mw) of 52,000 g/mol.

Example 4: Preparation of poly(amide-imide) copolymer (D)

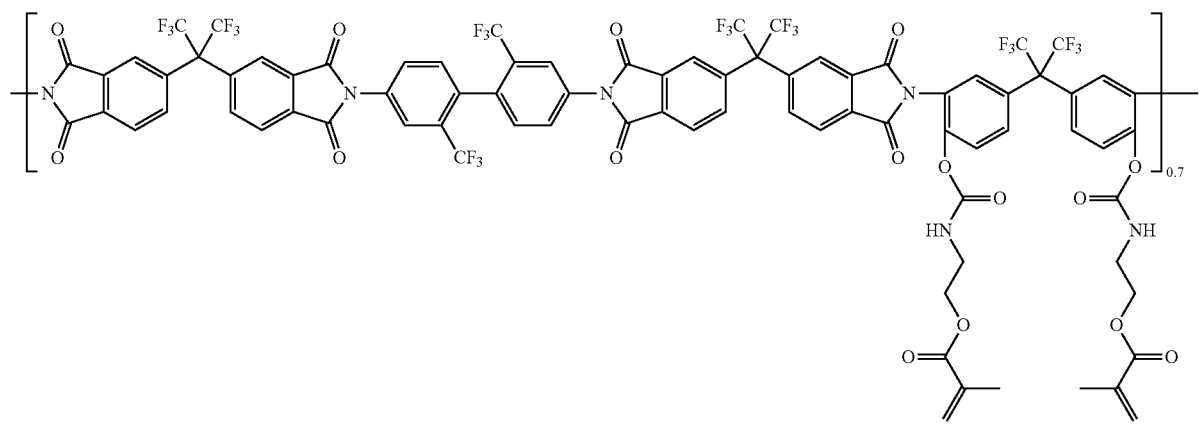

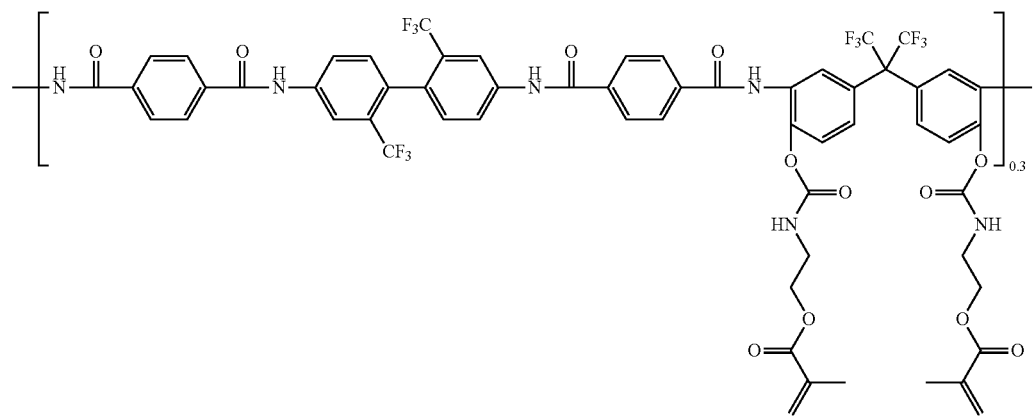

12 g of a poly(amide-imide) copolymer (D) was prepared in the same manner in Example 1, except that 4,4'-(hexafluoroisopropylidene)diphthalic anhydride and terephthaloyl chloride were used in an amount of 9.33 g (21.0 mmol) and 1.83 g (9.0 mmol), respectively.

The molecular weight of the obtained poly(amide-imide) copolymer (D) was measured through GPC (gel permeation chromatography) in a THF solvent, and the measurement result showed a weight average molecular weight (Mw) of 41,000 g/mol.

Comparative Example 1: Preparation of polyimide (E)

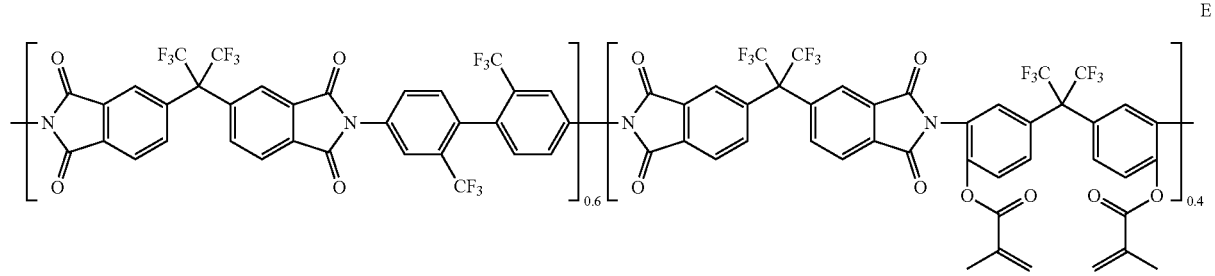

To a 500 mL three-necked round bottomed flask equipped with a Dean-Stark trap, a nitrogen inlet and a mechanical stirrer, 6.34 g (19.8 mmol) of 2,2'-bis(trifluoromethyl)-4,4'-diamino biphenyl (TFMB) and 3.63 g (9.91 mmol) of 2,2-bis(3-amino-4-hydroxyphenyl)hexafluoropropane (BisAPAF) were added while passing nitrogen gas therethrough, dissolved in 183 g of N-methyl-2-pyrrolidone (NMP) and then heated at 40° C.

Then, 8.88 g (20.0 mmol) of 4,4'-(hexafluoroisopropylidene)diphthalic anhydride (6FDA) was added thereto, and the mixture was stirred at 40° C. for about 4 hours.

Then, 1.39 g (6.31 mmol) of butylated hydroxy toluene (BHT), 23.7 g (300 mmol) of pyridine, 23.1 g (150 mmol) of methacrylic anhydride were stirred at 60° C. overnight. After the reaction was completed, excess ethanol (2 L) was added dropwise to the stirred reaction solution to form a precipitate. The obtained precipitate was separated by filtration under reduced pressure, washed three times with ethanol, and dried in a vacuum oven at 80° C. for about 8 hours to obtain 12 g of a polyimide resin (E) having a methacrylate group.

Comparative Example 2: Preparation of poly(amide-imide) copolymer (F)

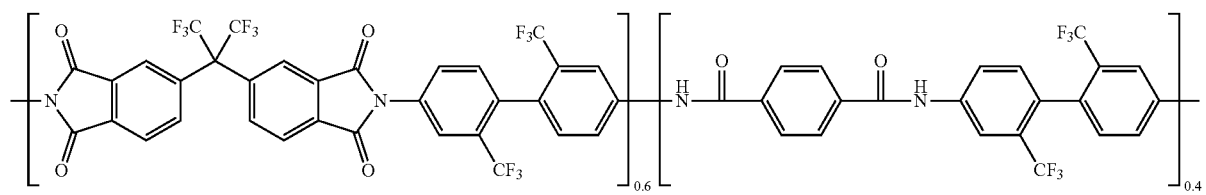

To a 500 mL three-necked round bottomed flask equipped with a Dean-Stark trap, a nitrogen inlet and a mechanical stirrer, 9.51 g (29.7 mmol) of 2,2'-bis(trifluoromethyl)-4,4'-diamino biphenyl (TFMB) was added while passing nitrogen gas therethrough, dissolved in 183 g of N-methyl-2-pyrrolidone (NMP) and then heated at 40° C.

Then, 8.00 g (18.0 mmol) of 4,4'-(hexafluoroisopropylidene)diphthalic anhydride (6FDA) was added thereto, and the mixture was stirred at 40° C. for about 3 hours. 2.44 g (12.0 mmol) of terephthaloyl chloride (TPC) were added thereto, and then stirred for 3 hours.

Then, the temperature was raised to 200° C., and the reaction was further performed for 15 hours. After the reaction was completed, excess ethanol (2 L) was added dropwise to the stirred reaction solution to form a precipitate. The obtained precipitate was separated by filtration under reduced pressure, washed three times with ethanol, and dried in a vacuum oven at 80° C. for about 8 hours to obtain 12 g of a poly(amide-imide) copolymer (F).

Comparative Example 3: Preparation of poly(amide-imide) copolymer (G)

350 g of N,N-dimethyl acetamide (DMAc) was filled in a reactor under nitrogen stream, and then 21.0 g (65.6 mmol) of 2,2'-bis(trifluoromethyl)-4,4'-biphenyl diamine (TFMB) was dissolved while maintaining the temperature of the reactor to 25° C. 17.7 g (39.8 mmol) of 4,4'-(hexafluoroisopropylidene)diphthalic anhydride (6FDA) was added to the TFMB solution at the same temperature, and dissolved with stirring for a predetermined period of time.

After sufficient stirring was performed, the temperature was lowered to 0° C., 5.38 g (26.5 mmol) of terephthaloyl chloride (TPC) was added thereto and stirring was continued. Viscosity of the polyamide-imide precursor solution produced from the reaction was adjusted to a predetermined level to obtain a polyamide-imide precursor solution having a solid content of 13%. 3.46 g (43.7 mol) of pyridine and 4.46 g (43.7 mmol) of acetic anhydride were added to the solution and sufficiently stirred, and then precipitated with methanol. The precipitated solid was filtered and dried in a 100° C. vacuum oven for 24 hours to obtain a polyamide-imide solid.

The dried polyamide-imide was dissolved in 300 g of DMAc, and 2 mol of 2-(methacryloyloxy)ethyl isocyanate (MOI) and 50 g of DMAc were added thereto. The resulting solution was reacted at 50° C. for 6 hours and then precipitated with methanol. The precipitated solid was dried to obtain a poly(amide-imide) copolymer (G).

Comparative Example 4: Preparation of poly(amide-imide) copolymer (H)

350 g of N,N-dimethyl acetamide (DMAc) was filled in a reactor under nitrogen stream, and then 21.0 g (65.6 mmol) of 2,2'-bis(trifluoromethyl)-4,4'-biphenyl diamine (TFMB) was dissolved while maintaining the temperature of the reactor to 25° C. 20.6 g (46.4 mmol) of 4,4'-(hexafluoroisopropylidene)diphthalic anhydride (6FDA) was added to the TFMB solution at the same temperature, and dissolved with stirring for a predetermined period of time.

After sufficient stirring was performed, the temperature was lowered to 0° C., 4.04 g (19.9 mmol) of terephthaloyl chloride (TPC) was added thereto and stirring was continued. Viscosity of the polyamide-imide precursor solution produced from the reaction was adjusted to a predetermined level to obtain a polyamide-imide precursor solution having a solid content of 13%. 4.19 g (53.0 mmol) of pyridine and 5.41 g (53.0 mmol) of acetic anhydride were added to the solution and sufficiently stirred, and then precipitated with methanol. The precipitated solid was filtered and dried in a 100° C. vacuum oven for 24 hours to obtain a polyamide-imide solid.

The dried polyamide-imide was dissolved in 300 g of DMAc, and 2 mol of 2-(methacryloyloxy)ethyl isocyanate (MOI) and 50 g of DMAc were added thereto. The resulting solution was reacted at 50° C. for 6 hours and then precipitated with methanol. The precipitated solid was dried to obtain a poly(amide-imide) copolymer (H).

Comparative Example 5: Preparation of poly(amide-imide) copolymer (I)

350 g of N,N-dimethyl acetamide (DMAc) was filled in a reactor under nitrogen stream, and then 21.0 g (65.6 mmol) of 2,2'-bis(trifluoromethyl)-4,4'-biphenyl diamine (TFMB) was dissolved while maintaining the temperature of the reactor to 25° C. 20.6 g (46.4 mmol) of 4,4'-(hexafluoroisopropylidene)diphthalic anhydride (6FDA) was added to the TFMB solution at the same temperature, and dissolved with stirring for a predetermined period of time.

After sufficient stirring was performed, the temperature was lowered to 0° C., 4.04 g (19.9 mmol) of terephthaloyl chloride (TPC) was added thereto and stirring was continued. Viscosity of the polyamide-imide precursor solution produced from the reaction was adjusted to a predetermined level to obtain a polyamide-imide precursor solution having a solid content of 13%. 3.14 g (39.8 mmol) of pyridine and 4.06 g (39.8 mmol) of acetic anhydride were added to the solution and sufficiently stirred, and then precipitated with methanol. The precipitated solid was filtered and dried in a 100° C. vacuum oven for 24 hours to obtain a polyamide-imide solid.

The dried polyamide-imide was dissolved in 300 g of DMAc, and 2 mol of 2-(methacryloyloxy)ethyl isocyanate (MOI) and 50 g of DMAc were added thereto. The resulting solution was reacted at 50° C. for 6 hours and then precipitated with methanol. The precipitated solid was dried to obtain a poly(amide-imide) copolymer (I).

Comparative Example 6: Preparation of poly(amide-imide) copolymer (K)

350 g of N,N-dimethyl acetamide (DMAc) was filled in a reactor under nitrogen stream, and then 21.0 g (65.6 mmol) of 2,2'-bis(trifluoromethyl)-4,4'-biphenyl diamine (TFMB) was dissolved while maintaining the temperature of the reactor to 25° C. 20.6 g (46.4 mmol) of 4,4'-(hexafluoroisopropylidene)diphthalic anhydride (6FDA) was added to the TFMB solution at the same temperature, and dissolved with stirring for a predetermined period of time.

After sufficient stirring was performed, the temperature was lowered to 0° C., 4.04 g (19.9 mmol) of terephthaloyl chloride (TPC) was added thereto and stirring was continued. Viscosity of the polyamide-imide precursor solution produced from the reaction was adjusted to a predetermined level to obtain a polyamide-imide precursor solution having a solid content of 13%. 3.46 g (43.7 mmol) of pyridine and 4.46 g (43.7 mmol) of acetic anhydride were added to the solution and sufficiently stirred, and then precipitated with methanol. The precipitated solid was filtered and dried in a 100° C. vacuum oven for 24 hours to obtain a polyamide-imide solid.

The dried polyamide-imide was dissolved in 300 g of DMAc, and then 2 mol of 2-(methacryloyloxy)ethyl isocyanate (MOI) and 50 g of DMAc were added thereto. The resulting solution was reacted at 50° C. for 6 hours and then precipitated with methanol. The precipitated solid was dried to obtain a poly(amide-imide) copolymer (K).

Experimental Example

Polyamide-imide or polyimide resin obtained in Examples and Comparative Examples and DPCA-120 monomer (polyfunctional (meth)acrylate monomer) were mixed in a weight ratio of 5:1, and dissolved in methyl ethyl ketone (MEK) to be 20% by weight of solids with 2% by weight of Igacure184 initiator. The mixed solution thus obtained was coated on a glass substrate by a knife coating method, dried at 60° C. for 5 minutes, and photo-cured using a UV curing machine. Then, the resultant was subjected to a heat treatment at 120° C. for 10 minutes, and peeled to obtain a polyimide film. Then, the polyimide film was evaluated for physical properties by the following method, and the results are shown in Table 1 below.

Experimental Example 1: Yellow Index (Y.I.)

The yellow index of the film sample (thickness 50±2 μm) was measured using a COH-400 Spectrophotometer (NIPPON DENSHOKU INDUSTRIES) according to the measuring method as defined in ASTM D1925, and the results are shown in Table 1 below.

Experimental Example 2: Glass Transition Temperature (Tq)

The glass transition temperature of the film sample (thickness 50±2 μm) was measured using a TMA IC600 device, and the values are shown in Table 1 below.

Experimental Example 3: Modulus

The modulus (Modulus, GPa) of the film sample (thickness 50±2 μm) was measured using DMA q800, and the results are shown in Table 1.

TABLE 1

| | Yellow index | Glass transition temperature (° C.) | Modulus (GPa) |
|---|---|---|---|
| Example 1 | 1.68 | 191 | 4.21 |
| Example 2 | 1.62 | 185 | 4.11 |

TABLE 1-continued

|  | Yellow index | Glass transition temperature (° C.) | Modulus (GPa) |
|---|---|---|---|
| Example 3 | 1.72 | 193 | 4.15 |
| Example 4 | 1.61 | 192 | 4.08 |
| Comparative Example 1 | 1.67 | 190 | 3.9 |
| Comparative Example 2 | 2.71 | 181 | 3.6 |
| Comparative Example 3 | 3.11 | 180 | 2.52 |
| Comparative Example 4 | 3.02 | 175 | 2.48 |
| Comparative Example 5 | 3.15 | 181 | 2.42 |
| Comparative Example 6 | 3.00 | 173 | 2.38 |

According to Table 1, it was confirmed that in Examples 1 to 4, the yellow index is low, and both the glass transition temperature and the modulus are high. On the other hand, it was confirmed that Comparative Example 1 has a problem that the modulus is low and Comparative Examples 2 to 6 have problems that the yellow index is high and the glass transition temperature and the modulus are low.

What is claimed is:

1. A polymer film comprising a cured product of a poly(amide-imide) copolymer comprising imide repeating units and amide repeating units,
   wherein at least one of the imide repeating units is substituted with a functional group including Chemical Formula 1 and at least one of the amide repeating units is substituted with a functional group including Chemical Formula 1,
   wherein the imide and amide repeating units each substituted with a functional group including Chemical Formula 1 are contained in an amount of 5 to 40 parts by mol based on 100 parts by mol of the whole repeating units of the poly(amide-imide) copolymer, and
   wherein the polymer film has a yellow index of 1.61 to 1.72 measured according to ASTM D1925 based on a thickness of 50±2 μm, a glass transition temperature of 185° C. to 193° C. measured using a TMA IC600 device, and a modulus of 4.08 GPa to 4.21 GPa measured using DMA 9800 based on a thickness of 50±2 μm:

[Chemical Formula 1]

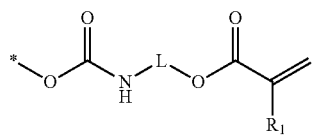

wherein,
$R_1$ is hydrogen or an alkyl group having 1 to 10 carbon atoms, and
L is a single bond or an alkylene having 1 to 10 carbon atoms.

2. The polymer film of claim 1, wherein
$R_1$ is hydrogen or methyl.

3. The polymer film of claim 1, wherein
L is an alkylene having 1 to 5 carbon atoms.

4. The polymer film of claim 1, wherein
the at least one of the imide repeating units includes any one selected from the group consisting of a first repeating unit represented by Chemical Formula 2-1 and a second repeating unit represented by Chemical Formula 2-2:

[Chemical Formula 2-1]

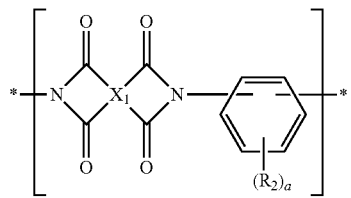

[Chemical Formula 2-2]

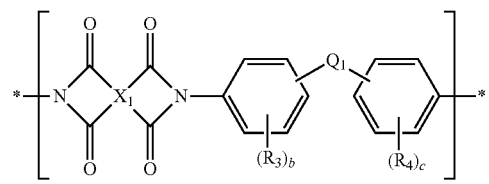

wherein, in the Chemical Formulae 2-1 and 2-2,
$X_1$ is a tetravalent organic group,
$R_2$ to $R_4$ are each independently hydrogen; a hydroxy group; an alkyl group having 1 to 10 carbon atoms; or the functional group including the Chemical Formula 1,
$Q_1$ is a single bond, —O—, —S—, —C(=O)—, —CH(OH)—, —S(=O)$_2$—, —Si(CH$_3$)$_2$—, —(CH$_2$)p- (where 1≤p≤10), —(CF$_2$)q- (where 1≤q≤10), —C(CH$_3$)$_2$—, —C(CF$_3$)$_2$— or —C(=O)NH—, and
a, b, and c are each independently an integer of 1 to 4.

5. The polymer film of claim 1, wherein
the at least one of the amide repeating units includes any one selected from the group consisting of a third repeating unit represented by Chemical Formula 3-1 and a fourth repeating unit represented by Chemical Formula 3-2:

[Chemical Formula 3-1]

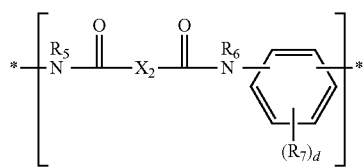

[Chemical Formula 3-2]

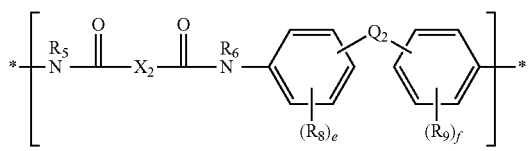

wherein, in the Chemical Formulae 3-1 and 3-2,
$X_2$ is an arylene group having 6 to 30 carbon atoms,
$R_5$ and $R_6$ are each independently hydrogen, or an alkyl group having 1 to 10 carbon atoms,
$R_7$ to $R_9$ are each independently hydrogen; a hydroxyl group; an alkyl group having 1 to 10 carbon atoms; or the functional group including the Chemical Formula 1,
$Q_2$ is a single bond, —O—, —S—, —C(=O)—, —CH(OH)—, —S(=O)$_2$—, —Si(CH$_3$)$_2$—, —(CH$_2$)p-

(where 1≤p≤10), —(CF$_2$)q- (where 1≤q≤10), —C(CH$_3$)$_2$—, —C(CF$_3$)$_2$— or —C(=O)NH—, and d, e and f are each independently an integer of 1 to 4.

6. The polymer film of claim 4, wherein
X$_1$ is any one group selected from the groups represented by the following structural formulae:

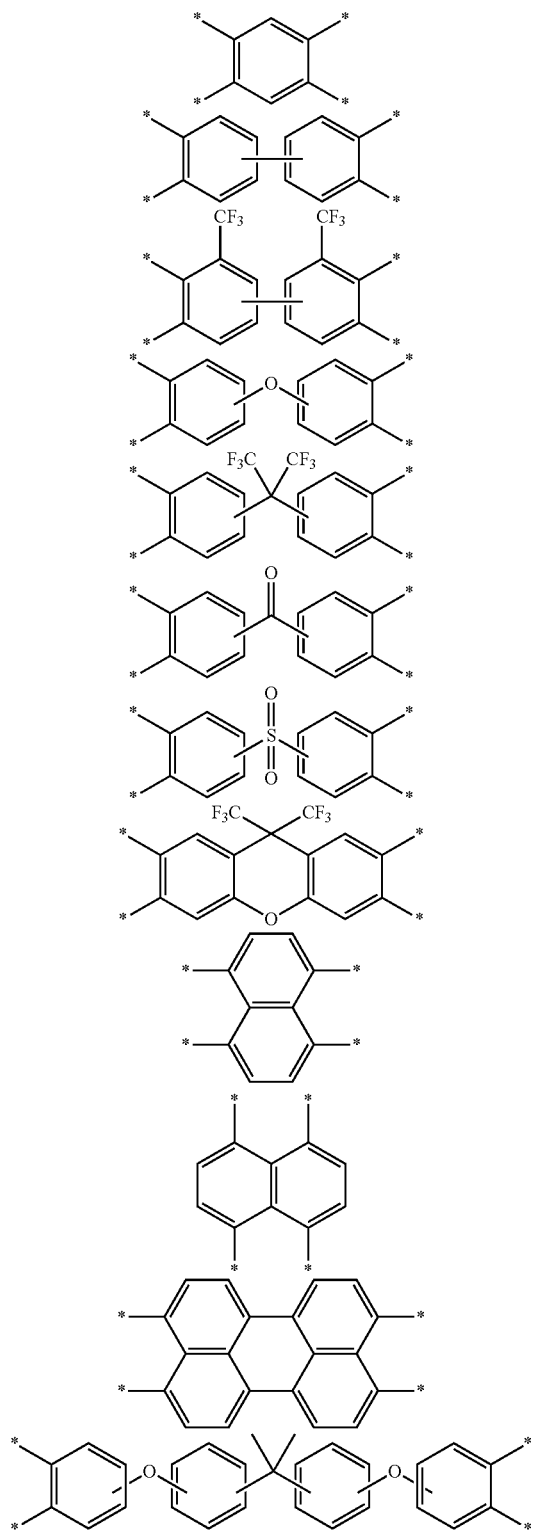

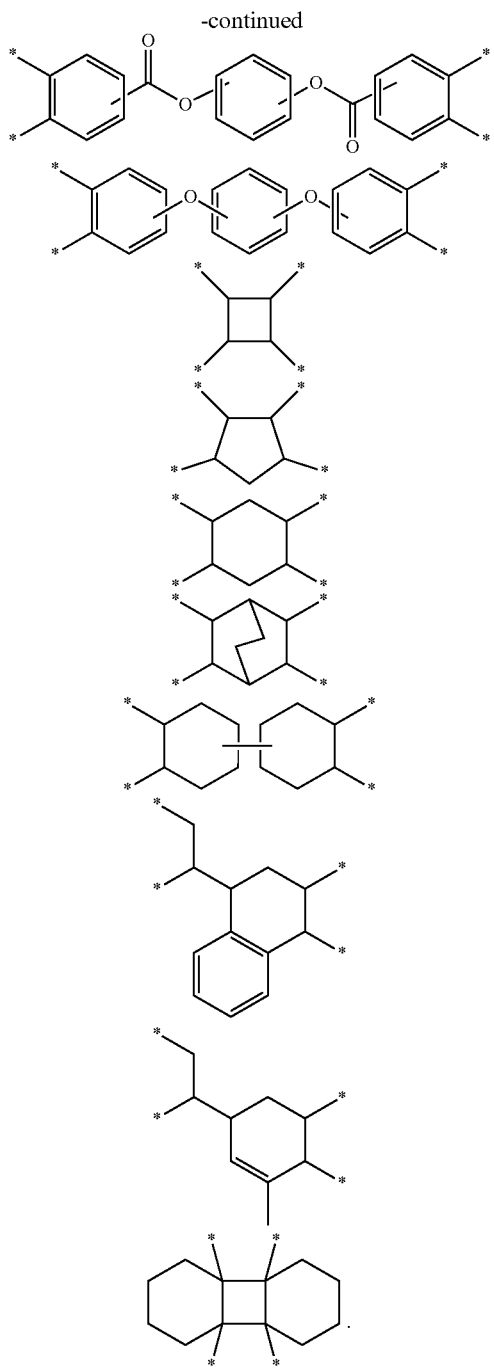

7. The polymer film of claim 5, wherein
X$_2$ is any one group selected from the groups represented by the following structural formulae:

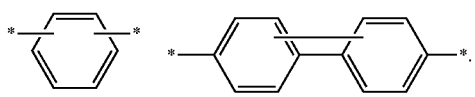

8. The polymer film of claim 1, wherein
a molar ratio of the imide repeating units and the amide repeating units is 10:90 to 90:10.

9. The polymer film of claim 1, wherein
a weight average molecular weight of the poly(amide-imide) copolymer is 5,000 to 300,000 g/mol.

10. The polymer film of claim 1, wherein
the polymer film has a haze measured according to ASTM D1003 is 2% or less.

11. A method for producing the polymer film of claim 1 comprising the steps of: coating a composition comprising the poly(amide-imide) copolymer onto a substrate and curing the coated composition at a temperature of 200° C. or less.

12. The method of claim 11, wherein the composition further comprises a photoinitiator.

13. The method of claim 11, wherein the composition further comprises a polyfunctional (meth)acrylate monomer.

* * * * *